United States Patent
Fröhlich

[15] 3,685,086
[45] Aug. 22, 1972

[54] PRESSURE INTENSIFIER FOR WINDSHIELD WIPERS

[72] Inventor: Karl Fröhlich, Bernardstrasse 9, Hausen, Germany

[22] Filed: Aug. 5, 1970

[21] Appl. No.: 61,232

[30] Foreign Application Priority Data

Sept. 30, 1969 Germany.........G 69 38 113.1

[52] U.S. Cl. ............15/250.2, 15/250.35, 15/250.42
[51] Int. Cl. ..............................................B60s 1/32
[58] Field of Search....15/250, 250.2, 250.35, 250.42

[56] References Cited

UNITED STATES PATENTS

| | | | |
|---|---|---|---|
| 2,799,887 | 7/1957 | Nemic | 15/250 X |
| 3,037,233 | 6/1962 | Peras et al. | 15/250.42 |
| 3,317,946 | 5/1967 | Anderson | 15/250.42 |
| 3,320,628 | 5/1967 | Bacher et al. | 15/250.42 X |

FOREIGN PATENTS OR APPLICATIONS 1,105,704   3/1968   Great Britain..........15/250.42

*Primary Examiner*—P. Feldman
*Attorney*—Karl F. Ross

[57] ABSTRACT

A pressure-intensifying attachment for windshield wipers has a base plate, in the shape of a generally trapezoidal strip, which clamps onto a wiper arm and carries on its exposed surface a set of transverse wind-catching ribs progressively increasing in height from the narrow end to the wide end of the strip. The clamping unit comprises a bar of substantially triangular cross-section, integrally joined along one edge to the rear surface of the plate, bearing with the apex of its triangular profile upon the engaged wiper arm which is bracketed by upstanding flanges of a guide rail rigid with that rear surface.

7 Claims, 3 Drawing Figures

PATENTED AUG 22 1972 3,685,086

KARL FRÖHLICH
Inventor:
by Karl F. Ross
Attorney

PRESSURE INTENSIFIER FOR WINDSHIELD WIPERS

My present invention relates to a pressure intensifier for windshield wipers, designed to avoid the floating of the windshield wiper on the water film formed on the windshield in the rain.

A known pressure intensifier consists of a flat or slightly inwardly curved wind-catching plate broadening from one end to the other and having a clamp at its lower side which clasps the wiper arm by pinching. This known pressure intensifier satisfies the needs of the driver only insufficiently. On the one hand the pressure obtained by this attachment is not sufficient for urging the windshield wipers firmly enough against the windshield. The primary reason for this is the fact that the angle formed by the wind-catching plate and the horizontal — due to the slanting of the windshield — is too small for an effective utilization of the dynamic wind pressure obtaining at high speed. Another disadvantage of the known attachment is the fact that it is not possible to use it universally for all types of wipers, so that the pressure intensifiers must be manufactured with holding devices corresponding to the different wiper types.

Another known pressure intensifier consists primarily of several wings fixed — with an angle of inclination of about 45° — one by one directly on the holding device. In this case the wings are situated substantially perpendicularly to the longitudinal axis of the vehicle, so that a good intensification of pressure is achieved, but because of its excessive size it cannot be used for vehicles with disappearing wipers.

The object of the present invention is the creation of a smaller pressure intensifier which — with sufficient gripping force — may be fixed easily on every type of wiper and which guarantees an adequate intensification of pressure in all operational and weather conditions. In contradistinction to the conventional pressure intensifier described above, the wind-catching surface of the elongate base plate of my improved attachment has transverse ribs shaped like a swallow-tail. These transverse ribs form wind-catching areas directed into the driving wind, thereby fully utilizing the force of that wind, so that a high wiper pressure is realized. Furthermore, the swallow-tail form of the transverse ribs effects a constant and uninterrupted flow of the air. There are no dead areas where snow or water could deposit for a longer time; snow amassing during hours of parking will immediately be seized and taken away by the driving wind when the car is started.

Advantageously the transverse ribs increase in height from the small end to the broad end of the wind-catching plate, whereby even on very slanting windshields or wiper arms full effectiveness of the upper ribs is also insured.

For fastening the pressure intensifier on the wiper arm I prefer to use a U-profile with a throughgoing or interrupted side flange as a guide rail for the wiper arm in co-operation with a clamping bar of nearly triangular cross-section which overhangs the rail over the clamping area. In this case the position of the clamping bar relative to the guide rail is advantageously such that — as seen in cross-section — the bearing ridge formed by the apex of the triangle is shifted toward the outside, i.e., in the direction of the free edge of the clamping arm, relative to the centerline of the guide rail. In this way, pressure intensifiers of one given size may be used for every current type of wiper with a sufficiently strong hold on the wiper arm. In order to avoid the exertion of torsion by the pressure intensifier on the wiper arm, an additional holding lug may be fixed to the clamping bar at its attached edge. Furthermore, the lateral edge on the open side of the clamp may be beveled off at the inside in order to facilitate the fastening of the attachment on the wiper arm.

An embodiment of my invention has been illustrated in the accompanying drawing in which.

Figure 1:
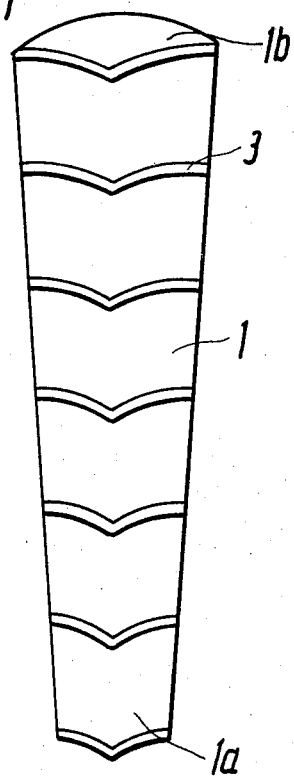
FIG. 1 shows a top view of a pressure intensifier according to the invention.

In the drawing I have shown an elongate wind-catching plate 1 of a pressure intensifier according to the invention, which is fixed to a wiper arm 9 by a clamping device generally designated 2. The wind-catching plate, here shown as a flat strip of generally trapezoidal shape, broadens from one end 1a to the other end 1b.

Figure 2:
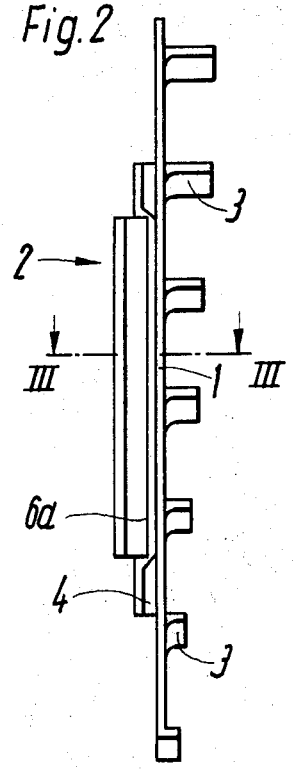
FIG. 2 shows a side view of the pressure intensifier of FIG. 1.

According to the invention, and as best seen in FIG. 1, the base plate 1 has its exposed surface provided with transverse ribs 3 of swallow-tail shape which moreover (see FIG. 2) progressively increase in height from the small end 1a toward the broad end 1b. At the side directed toward the driving wind, i.e., forwardly with reference to the motion of the vehicle bearing the wiper, the ribs 3 are rounded off at the edges connecting them with the wind-catching plate, whereby accumulation of snow and ice is avoided.

Figure 3:
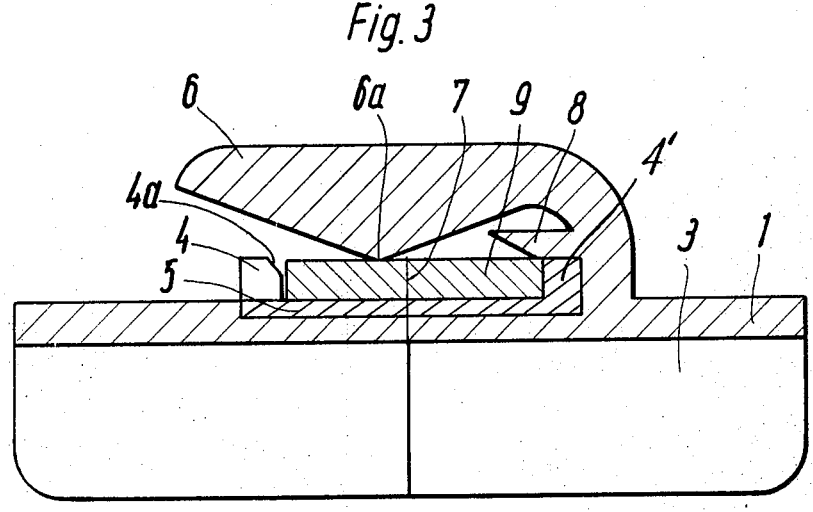
FIG. 3 shows a cross-sectional view taken on the line III—III of FIG. 2.

For fastening the attachment to the wiper arm 9 there is provided a U-profile 5 forming a guide rail with a gap in one of its flanges to form a pair of spaced-apart retaining ledges 4, this rail confronting a clamping bar 6 of nearly triangular cross-section fixed at one side to the wind-catching plate 1 and overhanging the guide rail 5 along the clamping area. The bearing edge 6a of the clamping bar 6 is shifted toward the outside, i.e., offset in the direction of the outer edge of the bar with reference to the longitudinal plane of symmetry 7 of the rail 5 indicated in FIG. 3.

Between the clamping bar 6 and the guide rail 5 there is provided a holding lug 8 preventing a twisting of the wiper arm 9 by the unsymmetrical bearing pressure of ridge 6a, the lug overlying the inner flange 4' of the rail and projecting past it to engage the wiper arm. In order to facilitate the mounting of the attachment on the wiper arm, the inner edges 4a of the holding ledges 4 are beveled.

The complete pressure intensifier may be manufactured all in one piece, in which case the rail flanges are situated directly on the base plate 1.

I claim:

1. A pressure-intensifying attachment for a windshield wiper, comprising and elongate base plate of generally trapezoidal shape with a wider end and a narrower end, clamping means on one surface of said plate for fastening it to a wiper arm, and a set of transverse ribs on the exposed opposite surface of said plate, said ribs being of swallow-tail configuration.

2. An attachment as defined in claim 1 wherein said ribs increase progressively in height from said narrower end to said wider end.

3. An attachment as defined in claim 1 wherein said ribs are rounded at their junctions with said plate.

4. An attachment as defined in claim 1 wherein said clamping means comprises a guide rail extending longitudinally on said one surface, said rail having upstanding flanges bracketing said wiper arm, and a pressure bar integral with said plate overhanging said rail, said bar being of generally triangular cross-section with a bearing ridge at the apex of the triangle confronting said plate.

5. An attachment as defined in claim 4 wherein said bearing ridge is offset from the centerline of said rail toward the free edge of said bar.

6. An attachment as defined in claim 5 wherein said bar is provided at its attached edge with a holding lug overlying and projecting beyond the adjoining flange of said rail.

7. An attachment as defined in claim 4 wherein the flange of said rail next to the free edge of said bar is inwardly beveled.

* * * * *